(No Model.)
G. C. BARNEY.
Billiard Cue Tip.
No. 237,719. Patented Feb. 15, 1881.
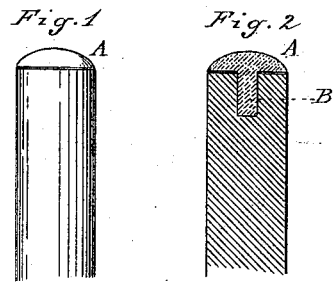
Attest:
A. Barthel
J. Paul Mayer
Inventor:
George C. Barney
by Thos. S. Sprague
Atty

UNITED STATES PATENT OFFICE.

GEORGE C. BARNEY, OF DETROIT, MICHIGAN, ASSIGNOR OF ONE-HALF TO WILLIAM W. PETHERICK, OF SAME PLACE.

BILLIARD-CUE TIP.

SPECIFICATION forming part of Letters Patent No. 237,719, dated February 15, 1881.

Application filed November 10, 1880. (No model.)

*To all whom it may concern:*

Be it known that I, GEORGE C. BARNEY, of Detroit, in the county of Wayne and State of Michigan, have invented an Improvement in Billiard-Cue Tips, of which the following is a specification.

The nature of my invention relates to new and useful improvements in the construction and application of billiard-cue tips, by the use of which the employment of chalk is rendered unnecessary. The tip is securely attached to the end of the billiard-cue and requisite firmness and elasticity of the tip produced.

The invention therefore consists in the peculiar construction and application of cue-tips, as more fully hereinafter described.

Figure 1 is an elevation of a section of a cue with my improved tip. Fig. 2 is a central longitudinal section of a cue with my improved tip attached thereto.

In the use of cue-tips as ordinarily constructed and applied the surface of the tip must be well chalked to prevent the tip from slipping when brought into contact with the smooth surface of the ball. This use of chalk is objectionable, as it soils the cloth of the table, which is rapidly worn out by the hard and frequent brushing, and soils the hands and clothing of the player. To remedy this defect the tips of billiard-cues have heretofore been made of vulcanized rubber mixed with chalk, whereby the employment of chalk applied from time to time to the tip was dispensed with; but in such construction the tip cemented to the end of the cue became liable to be detached therefrom. To obviate this defect and give increased firmness and elasticity to the tip I form in one piece with the tip, made of rubber intermingled with chalk, a short central shaft constructed of hard rubber, which is inserted in a hole bored centrally in the end of the cue and cemented therein, whereby the tip is securely attached to the end of the cue and increased firmness and elasticity are given the tip.

In the accompanying drawings, which form a part of this specification, A represents a tip, spherical or oval upon one face and flat upon the reverse. This button-shaped tip is made of what is termed "semi-hard rubber," into which chalk is introduced in the process of manufacture, as corundum, emery, or analogous substances are introduced into such rubber in the manufacture of what are known in the market as "ink-erasers." The chalk or other substance that will produce a like result is first reduced to a powder before being amalgamated with the rubber. The flattened lower face of the tip A is provided with the short central cylindrical shaft, B, made of hard rubber, and extending downward and formed in one piece with the disk portion A of the tip, and adapted to be inserted in a hole bored in the upper end of the cue, cement being applied in the hole and to the lower face of the disk portion of the tip, whereby the tip is securely attached to the end of the cue and increased firmness and elasticity produced in the tip.

I am aware that rubber cue-tips have been made and unsuccessfully used. Therefore I do not broadly claim cue-tips made of rubber.

I am aware that a billiard-cue tip formed of a mixture of vulcanized rubber and chalk and a billiard-cue tip formed of leather, with its screw-threaded shank and disk made in one piece, have heretofore been employed, and I therefore lay no claim to such construction, my invention obviating the necessity of chalking the tip, as in the first invention disclaimed, and at the same time giving greater firmness and elasticity to the tip by the employment of the hard-rubber shank; but

What I claim as my invention is—

As a new article of manufacture, the billiard-cue tip herein described, consisting of the disk A, composed of a mixture of soft rubber and chalk, and shank B, formed of hard rubber, the disk and shank being formed in one piece, as and for the purpose set forth.

GEORGE C. BARNEY.

Witnesses:
H. S. SPRAGUE,
J. PAUL MAYER.